(12) United States Patent
Yamane et al.

(10) Patent No.: US 8,175,763 B2
(45) Date of Patent: May 8, 2012

(54) AUTOMATIC AIRCRAFT TAKEOFF AND LANDING APPARATUS AND METHOD FOR ACCOMPLISHING THE SAME

(75) Inventors: Akihiro Yamane, Tokyo (JP); Mitsuru Kono, Tokyo (JP); Takahiro Kumamoto, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 52 days.

(21) Appl. No.: 12/352,922

(22) Filed: Jan. 13, 2009

(65) Prior Publication Data
US 2009/0171518 A1 Jul. 2, 2009

Related U.S. Application Data

(62) Division of application No. 11/103,725, filed on Apr. 12, 2005.

(30) Foreign Application Priority Data

Apr. 15, 2004 (JP) .................................. 2004-120814

(51) Int. Cl.
*G06G 7/70* (2006.01)
*G05D 1/08* (2006.01)
*G05D 1/10* (2006.01)

(52) U.S. Cl. ............ 701/16; 701/15; 244/180; 244/181; 244/183

(58) Field of Classification Search .......... 244/180–188; 701/15, 16
See application file for complete search history.

(56) References Cited

U.S. PATENT DOCUMENTS

| 2,612,331 | A |   | 9/1952  | Frazier |            |
|-----------|---|---|---------|---------|------------|
| 3,031,662 | A |   | 4/1962  | Bond    |            |
| 3,199,811 | A |   | 8/1965  | Brainerd |           |
| 3,295,369 | A |   | 1/1967  | Priestley |          |
| 3,892,373 | A |   | 7/1975  | Doniger |            |
| 4,792,906 | A | * | 12/1988 | King et al. ........................ 701/5 |
| 5,142,478 | A | * | 8/1992  | Crook ............................. 701/16 |
| 5,337,982 | A |   | 8/1994  | Sherry  |            |

(Continued)

FOREIGN PATENT DOCUMENTS

GB            1036721         7/1966

(Continued)

OTHER PUBLICATIONS

"FHI Develops a Compact, Light-Weight Autonomous Pilot System for Small Aircrafts and Unmanned Aerial Vehicles" Subaru Press Release, Aug. 27, 2003 http://www.fhi.co.jp/english/news/press/2003/03_08_27e.htm.*

(Continued)

*Primary Examiner* — Tien Dinh
*Assistant Examiner* — Joseph W Sanderson
(74) *Attorney, Agent, or Firm* — Smith, Gambrell & Russell, LLP

(57) ABSTRACT

An automatic landing apparatus for an aircraft includes: an altitude sensor; an airspeed sensor; an attitude angle sensor; a direction sensor; a position sensor; a landing command inputting section; and a control device, including: an approaching flight control section for realizing an approaching flight along a predetermined path by controlling a propulsion device and a control surface, in response to a landing command; a flare control section for controlling the propulsion device to provide a minimum output and controlling the control surface to perform a flare when the altitude of the aircraft becomes less than a predetermined landing altitude; and a landing run control section for realizing a landing run by controlling the propulsion device to maintain the minimum output and controlling the control surface to maintain the attitude angle and the traveling direction of the aircraft when the airspeed of the aircraft becomes less than a predetermined landing speed.

21 Claims, 8 Drawing Sheets

U.S. PATENT DOCUMENTS

| | | | |
|---|---|---|---|
| 5,714,948 A * | 2/1998 | Farmakis et al. | 340/961 |
| 5,716,032 A | 2/1998 | McIngvale | |
| 5,901,927 A | 5/1999 | Ho | |
| 6,088,632 A | 7/2000 | Zaccaria | |
| 6,285,298 B1 | 9/2001 | Gordon | |
| 6,353,409 B1 | 3/2002 | Keller | |
| 6,437,707 B1 | 8/2002 | Johnson | |
| 6,751,535 B2 | 6/2004 | Mori | |
| 6,880,784 B1 | 4/2005 | Wilkinson | |
| 7,068,187 B2 | 6/2006 | Ishihara et al. | |
| 7,195,200 B2 * | 3/2007 | Yamane | 244/76 R |
| 7,302,316 B2 * | 11/2007 | Beard et al. | 701/11 |

FOREIGN PATENT DOCUMENTS

| | | |
|---|---|---|
| GB | 1133081 | 11/1968 |
| JP | 51087299 | 7/1976 |
| JP | 4331698 | 11/1992 |
| JP | 08-108899 | 4/1996 |

OTHER PUBLICATIONS

"Automatic Take-Off and Landing Control for Small UAV's" Riseborough, P. Jul. 20-23, 2004, BAE Systems, Melbourne Australia http://ascc2004.ee.mu.oz.au/proceedings/papers/P110.pdf.*

"1959 Cessna 172 Owners Manual" Cessna Aircraft Company, 1959, available online at http://www.micro-tools.net/pdf/Cessna/172_poh_59.pdf.*

"1966 Cessna 182-J Skylane Performance and Specifications" Cessna Aircraft Company, 1966, available online at http://www.micro-tools.net/pdf/Cessna/182_poh_66.pdf.*

Koku Uchu Kogaku Binran, Japan Maruzen, Sep. 30, 1992, $2^{nd}$ Ed. *Society for Aeronautical and Space Sciences*, Oct. 8-10, 2003, Brochure for the Proceeding of the $41^{st}$ Aircraft Symposium, 9 pages (with cover sheet translation).

T. Nagayama et al., "Automatic Takeoff & Landing System of Fixed-Wing Unmanned Aerial Vehicle", *The $41^{st}$ Aircraft Symposium*, (2003), 4 pages (w/translation).

* cited by examiner

AUTOMATIC AIRCRAFT TAKEOFF AND LANDING APPARATUS AND METHOD FOR ACCOMPLISHING THE SAME

CROSS-REFERENCE TO RELATED APPLICATIONS

This application is a divisional of U.S. patent application Ser. No. 11/103,725, filed on Apr. 12, 2005, which claims priority to Japanese Patent Application No. 2004-120814 filed on Apr. 15, 2004, which are incorporated herein by reference in its entirety.

BACKGROUND OF THE INVENTION

1. Field of the Invention

The present invention relates to an automatic takeoff apparatus for an aircraft, an automatic landing apparatus for an aircraft, an automatic takeoff and landing apparatus for an aircraft, an automatic takeoff method for an aircraft, an automatic landing method for an aircraft and an automatic takeoff and landing method for an aircraft.

2. Description of Related Art

So far, several technologies for realizing an automatic landing of an aircraft have been proposed. As shown in FIG. 9, what is proposed for example is an automatic landing apparatus (ILS: Instrument Landing System) for making an airframe approach and land on a predetermined airstrip 300 by transmitting a guiding radio wave (a glide slope G, a marker beacon and the like) from a radio wave navigation facility located on the ground and by making a computer in an aircraft 200 control an attitude, a speed and a position of the airframe (see JP-Tokukaihei-8-108899A).

In a conventional automatic landing apparatus, an automatic approaching flight of the aircraft is realized by the computer that controls a propulsion device and a control surface. However, under a running mode after a landing of the aircraft, it is necessary to switch from an automatic control to a manual control by a pilot. Therefore, in reality, it was difficult to perform a landing under a full automatic control.

Further, in a conventional automatic takeoff and landing method, a landing gear switch is used for judging of takeoff and landing. Since it is necessary to provide landing gear switches as many as the number of feet, a structure of loaded apparatuses became complicated. Further, since the landing gear switch easily malfunctions, it was, necessary to establish a complicated control logic under an assumption of a case of malfunctioning.

SUMMARY OF THE INVENTION

An object of the present invention is to realize a full automatic takeoff and/or a full automatic landing without using a complicated loaded apparatus or a complicated control logic.

In accordance with a first aspect of the present invention, an automatic takeoff apparatus for an aircraft comprises: an altitude sensor for measuring an altitude of the aircraft from a ground; an airspeed sensor for measuring an airspeed of the aircraft; an attitude angle sensor for detecting an attitude angle of the aircraft; a direction sensor for detecting a direction of the aircraft; a takeoff command inputting section for inputting a takeoff command; and a control device for controlling a propulsion device and a control surface of the aircraft based on the altitude of the aircraft from the ground, the airspeed of the aircraft, the attitude angle of the aircraft, the direction of the aircraft and the takeoff command, wherein the control device comprises: a takeoff run control section for realizing a takeoff run by controlling the propulsion device to provide a maximum output and by controlling the control surface to maintain the attitude angle and a traveling direction of the aircraft constant, in response to the takeoff command; a rotation control section for controlling the control surface to perform a rotation when the airspeed of the aircraft exceeds a predetermined takeoff judgment speed; and an ascending flight control section for controlling the propulsion device and the control surface to make the aircraft perform an ascending flight up to a predetermined target altitude with a predetermined ascending speed maintained, when the altitude of the aircraft from the ground exceeds a predetermined takeoff judgment altitude.

In accordance with a second aspect of the present invention, an automatic landing apparatus for an aircraft comprises: an altitude sensor for measuring an altitude of the aircraft from a ground; an airspeed sensor for measuring an airspeed of the aircraft; an attitude angle sensor for detecting an attitude angle of the aircraft; a direction sensor for detecting a direction of the aircraft; a position sensor for detecting a position of the aircraft; a landing command inputting section for inputting a landing command; and a control device for controlling a propulsion device and a control surface of the aircraft, based on the altitude of the aircraft from the ground, the airspeed of the aircraft, the attitude angle of the aircraft, the direction of the aircraft, the position of the aircraft and the landing command, wherein the control device comprises: an approaching flight control section for realizing an approaching flight along a predetermined approaching path by controlling the propulsion device and the control surface, in response to the landing command; a flare control section for controlling the propulsion device to provide a minimum output and for controlling the control surface to perform a flare when the altitude of the aircraft from the ground becomes less than a predetermined landing judgment altitude; and a landing run control section for realizing a landing run by controlling the propulsion device to maintain the minimum output and by controlling the control surface to maintain the attitude angle and a traveling direction of the aircraft constant when the airspeed of the aircraft becomes less than a predetermined landing judgment speed.

In accordance with a third aspect of the present invention, an automatic takeoff and landing apparatus for an aircraft comprises: an altitude sensor for measuring an altitude of the aircraft from a ground; an airspeed sensor for measuring an airspeed of the aircraft; an attitude angle sensor for detecting an attitude angle of the aircraft; a direction sensor for detecting a direction of the aircraft; a position sensor for detecting a position of the aircraft; a takeoff command inputting section for inputting a takeoff command; a landing command inputting section for inputting a landing command; and a control device for controlling a propulsion device and an control surface of the aircraft, based on the altitude of the aircraft from the ground, the airspeed of the aircraft, the attitude angle of the aircraft, the direction of the aircraft, the position of the aircraft, the takeoff command and the landing command, wherein the control device comprises: a takeoff run control section for realizing a takeoff run by controlling the propulsion device to provide a maximum output and by controlling the control surface to maintain the attitude angle and a traveling direction of the aircraft constant, in response to the takeoff command; a rotation control section for controlling the control surface to perform a rotation when the airspeed of the aircraft exceeds a predetermined takeoff judgment speed; an ascending flight control section for controlling the propulsion device and the control surface to make the aircraft perform an ascending flight up to a predetermined target altitude with a predetermined ascending speed maintained, when the altitude of the aircraft from the ground exceeds a predetermined takeoff judgment altitude; an approaching flight control section for realizing an approaching flight along a predetermined approaching path by controlling the propulsion device and the control surface, in response to the landing command; a flare control section for controlling the propulsion device to provide a minimum output and for controlling the control surface to perform a flare when the altitude of the aircraft from the ground becomes less than a predetermined landing judgment altitude; and a landing run control section for realizing a landing run by controlling the propulsion device to maintain the minimum output and by controlling the control surface to maintain the attitude angle and a traveling direction of the aircraft constant when the airspeed of the aircraft becomes less than a predetermined landing judgment speed.

In accordance with a fourth aspect of the present invention, an automatic takeoff method for an aircraft comprises: obtaining information relating to an altitude of the aircraft from a ground, an airspeed of the aircraft, an attitude angle of the aircraft and a direction of the aircraft; inputting a takeoff command; and controlling a propulsion device and a control surface of the aircraft based on each of the obtained information and the takeoff command, wherein the controlling includes: realizing a takeoff run by controlling the propulsion device to provide a maximum output and by controlling the control surface to maintain the attitude angle and a traveling direction of the aircraft constant, in response to the takeoff command; controlling the control surface to perform a rotation when the airspeed of the aircraft exceeds a predetermined takeoff judgment speed; and controlling the propulsion device and the control surface to make the aircraft perform an ascending flight up to a predetermined target altitude with a predetermined ascending speed maintained, when the altitude of the aircraft from the ground exceeds a predetermined takeoff judgment altitude.

In accordance with a fifth aspect of the present invention, an automatic landing method for an aircraft comprises: obtaining information relating to an altitude of the aircraft from a ground, an airspeed of the aircraft, an attitude angle of the aircraft, a direction of the aircraft and a position of the aircraft; inputting a landing command; and controlling a propulsion device and an control surface of the aircraft, based on each of the obtained information and the landing command, wherein the controlling includes: realizing an approaching flight along a predetermined approaching path by controlling the propulsion device and the control surface, in response to the landing command; controlling the propulsion device to provide a minimum output and controlling the control surface to perform a flare when the altitude of the aircraft from the ground becomes less than a predetermined landing judgment altitude; and realizing a landing run by controlling the propulsion device to maintain the minimum output and by controlling the control surface to maintain the attitude angle and a traveling direction of the aircraft constant when the airspeed of the aircraft becomes less than a predetermined landing judgment speed.

In accordance with a sixth aspect of the present invention, an automatic takeoff and landing method for an aircraft comprises: obtaining information relating to an altitude of the aircraft from a ground, an airspeed of the aircraft, an attitude angle of the aircraft, a direction of the aircraft and a position of the aircraft; inputting a takeoff command; inputting a landing command; and controlling a propulsion device and a control surface based on each of the obtained information and one of the takeoff command and the landing command, wherein the controlling includes: realizing a takeoff run by controlling the propulsion device to provide a maximum output and by controlling the control surface to maintain the attitude angle and a traveling direction of the aircraft constant, in response to the takeoff command; controlling the control surface to perform a rotation when the airspeed of the aircraft exceeds a predetermined takeoff judgment speed; controlling the propulsion device and the control surface to make the aircraft perform an ascending flight up to a predetermined target altitude with a predetermined ascending speed maintained, when the altitude of the aircraft from the ground exceeds a predetermined takeoff judgment altitude; realizing an approaching flight along a predetermined approaching path by controlling the propulsion device and the control surface, in response to the landing command; controlling the propulsion device to provide a minimum output and controlling the control surface to perform a flare when the altitude of the aircraft from the ground becomes less than a predetermined landing judgment altitude; and realizing a landing run by controlling the propulsion device to maintain the minimum output and by controlling the control surface to maintain the attitude angle and a traveling direction of the aircraft constant when the airspeed of the aircraft becomes less than a predetermined landing judgment speed.

According to the first, third, fourth and sixth aspects of the present invention, the control device (in the control step), in response to the takeoff command, controls the propulsion device of the aircraft to provide a maximum output and controls the control surface to maintain the attitude angle and the traveling direction of the aircraft constant, for realizing a takeoff run. Next, the control device (in the control step) controls the control surface to perform a rotation when the airspeed of the aircraft exceeds a predetermined takeoff judgment speed. Continuously, the control device (in the control step) controls the propulsion device and the control surface to make the aircraft perform an ascending flight up to a predetermined target altitude with a predetermined ascending speed maintained, when the altitude of the aircraft from the ground exceeds a predetermined takeoff judgment altitude. In other words, whether shifting from the takeoff run control to the rotation control should be done is judged by referring to "airspeed" of the aircraft, and whether shifting from the rotation control to the ascending flight control should be done is judged by referring to "altitude from the ground" (above-ground level) of the aircraft. Thereby, it is possible to realize a full automatic takeoff from a ground run to an ascending flight. Furthermore, at this time, since judgment of takeoff (whether a takeoff is completed and it is possible to shift to the ascending flight) is done by referring to "altitude from the ground" of the aircraft, it is not necessary to use a landing gear for judging the takeoff. Therefore, it is possible to realize the full automatic takeoff without using a complicated loaded device or a complicated control logic. According to the second, third, fifth and sixth aspects of the present invention, the control device (in the control step), in response to the landing command, controls the propulsion device and the control surface to make the aircraft realize an approaching flight along a predetermined approaching path. Next, the control device (in the control step) controls the propulsion device to provide a minimum output and controls the control surface to perform a rotation when the altitude of the aircraft from the ground becomes less than a predetermined landing judgment altitude. Continuously, the control device (in the control step) controls the propulsion device t maintain the minimum output and controls the control surface to maintain the attitude angle and the traveling direction of the aircraft constant, when the airspeed of the aircraft becomes less than a predetermined landing judgment speed, for realizing a landing run.

In other words, whether shifting from the approaching flight control to the flare control should be done is judged by referring to "altitude from the ground" of the aircraft, and whether shifting from the flare control to the landing run control should be done is judged by referring to "airspeed" of the aircraft. Thereby, it is possible to realize a full automatic landing from the approaching flight to the run after the landing.

In accordance with the present invention, whether shifting from the takeoff run control to the rotation control should be done is judged by referring to "airspeed" of the aircraft, and whether shifting from the rotation control to the ascending flight control should be done is judged by referring to "altitude from the ground" of the aircraft. Thereby, it is possible to realize a full automatic takeoff from a ground run to an ascending flight. Further, whether shifting from the approaching flight control to the flare control should be done is judged by referring to "altitude from the ground" of the aircraft, and whether shifting from the flare control to the landing run control should be done is judged by referring to "airspeed" of the aircraft. Thereby, it is possible to realize a full automatic landing from the approaching flight to the run after the landing.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein.

PREFERRED EMBODIMENTS OF THE INVENTION

Hereinafter, an embodiment of the present invention will be described with reference to drawings.

First, with reference to FIG. 1 to FIG. 8, a structure of an automatic takeoff and landing apparatus relating to the present embodiment will be described. Here, the automatic takeoff and landing apparatus relating to the present embodiment is to realize a full automatic takeoff and landing of a fixed wing aircraft (hereafter, it is referred to as "aircraft") 1.

Figure 1:
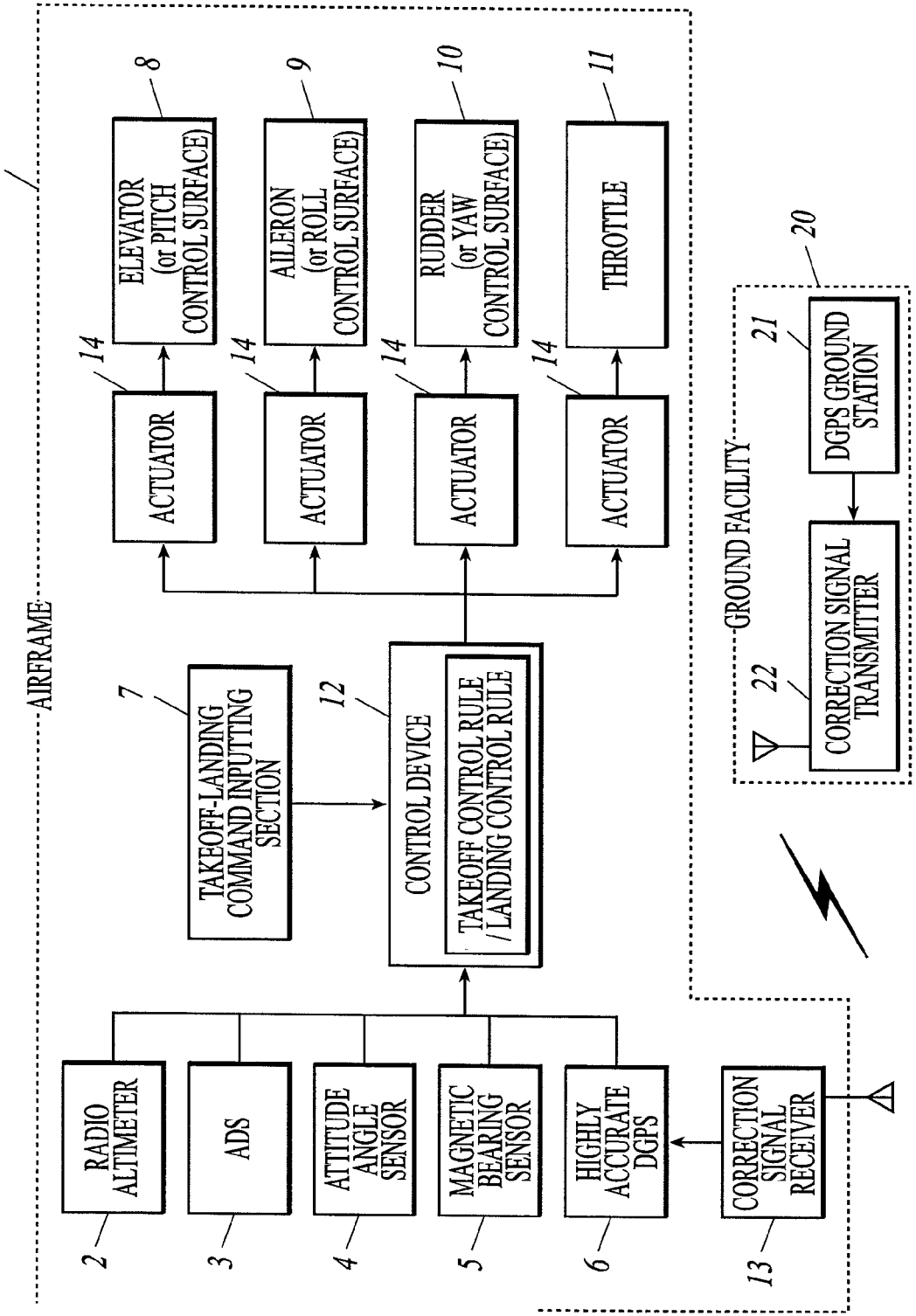
FIG. 1 is a block diagram for explaining a functional structure of an automatic takeoff and landing apparatus relating to an embodiment of the present invention.

As shown in FIG. 1, the automatic takeoff and landing apparatus comprises a radio altimeter 2, an ADS (Air Data Sensor) 3, an attitude angle sensor 4, a magnetic bearing sensor 5, a highly accurate DGPS (Differential Global Positioning System) 6, a takeoff-landing command inputting section 7, control surface (an elevator 8, an aileron 9 and a rudder 10), a throttle 11, a control device 12, a ground facility 20 and the like.

The radio altimeter 2 is an altitude sensor in the present invention. The radio altimeter 2 measures a time period from when an electric wave is emitted to a ground from the airframe 1 to when the reflected electric wave returns, for measuring an altitude from the ground. Here, instead of the radio altimeter 2, it is possible to adopt a laser altimeter or the like as the altitude sensor.

The ADS 3 is an airspeed sensor in the present invention. The ADS 3 measures an airspeed of the aircraft 1 by a Pitot tube loaded on the airframe 1 or based on a static pressure, a dynamic pressure an outside air temperature or the like. The attitude angle sensor 4 detects an attitude angle of the aircraft 1 (a roll angle, a pitch angle and a yaw angle). In the present embodiment, a gyro is used as the attitude angle sensor. The magnetic bearing sensor 5 is a direction sensor in the present invention. The magnetic bearing sensor 5 detects a direction of the aircraft 1.

Figure 8:
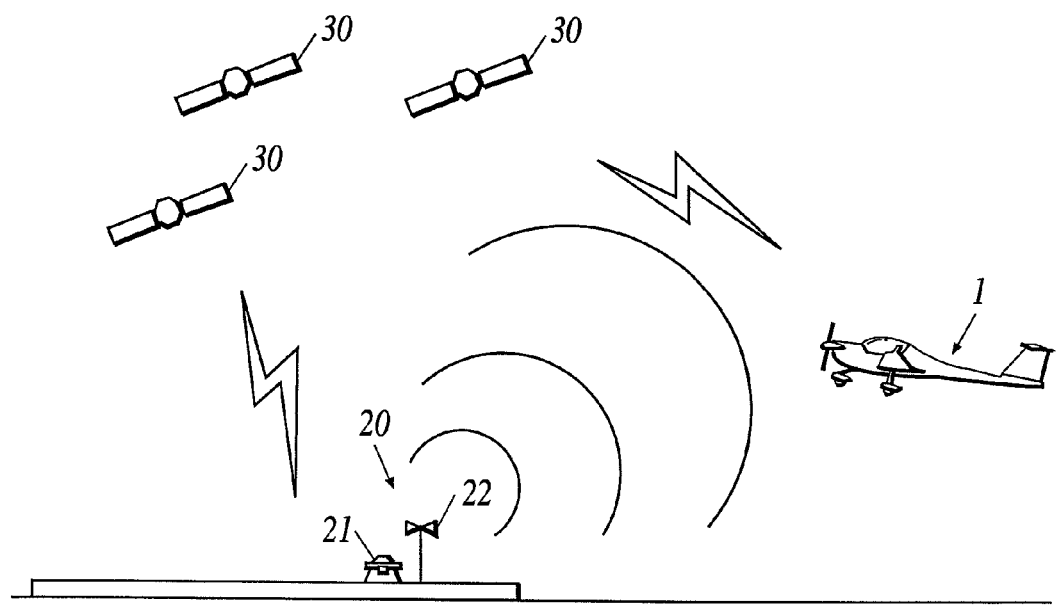
FIG. 8 is an explanatory view for explaining an outline of the automatic takeoff and landing apparatus relating to the embodiment of the present invention.

The highly accurate DGPS 6 detects a three-dimensional position of the aircraft 1 by receiving an information transmitted from GPS satellites 30 shown in FIG. 8 at a GPS receiver (not shown) loaded on the aircraft 1. Further, by receiving a correction information transmitted from the ground facility 20 at a correction signal receiver 13, the highly accurate DGPS 6 is capable of obtaining a highly accurate positional information by correcting the position detected through the GPS receiver. In other words, the highly accurate DGPS 6 and the correction signal receiver 13 constitute a position sensor in the present invention.

The takeoff and landing command inputting section 7 is a takeoff command inputting section and a landing command inputting section in the present invention. The takeoff and landing command inputting section 7 is used for inputting a takeoff command and a landing command to the control device 12. As the takeoff and landing command inputting section 7, when a person is on the aircraft 1, it is possible to use a group of various switches that can be operated by the person, and when a person is not on the aircraft 1, it is possible to use a receiver for receiving an inputting command from the ground.

The elevator 8, the aileron 9 and the rudder 10 constitute an control surface in the present invention. The control device 12 controls the elevator 8, the aileron 9 and the rudder 10 through actuators 14, the pitch angle, the roll angle and the yaw angle of the aircraft 1 are changed and a flight and a ground run are realized in a desired path.

The throttle 11 is used for operating an output of a propulsion device (an engine; not shown). The throttle 11 is controlled by the control device 12 through an actuator 14. The engine as the propulsion device is controlled by the control device 12 through the actuator 14 and the throttle 11.

The control device 12 is a microcomputer comprising a processing circuit, a memory for storing various control programs that are necessary for a flight control, various information and the like. The control device 12 controls the control surface and the propulsion device based on the information relating to the aircraft 1 (the altitude from the ground, the airspeed, the attitude angle, the direction, the position and the like), the takeoff command and the landing command.

Concretely, when the landing command is inputted at the takeoff and landing command inputting section 7, the control device 12 generates a control command for maximizing an output of the propulsion device. By controlling the throttle 11 according to the control command, the output of the propulsion device smoothly increases, and the output of the propulsion device is fixed at the maximum output. Further, in response to an input of the takeoff command, the control device 12 controls the control surface (the elevator 8, the aileron 9 and the rudder 10) to maintain the attitude angle and a traveling direction of the aircraft 1 constant. By controlling the propulsion device and the control surface in this way, it is possible to realize a takeoff run. In other words, the control device 12 comprises a takeoff run control section in the present invention.

Further, when the airspeed of the aircraft 1 exceeds a predetermined takeoff judgment speed, the control device 12 controls the control surface (the elevator 8) to perform a rotation. By controlling the control device in this way, it is possible to shift from a takeoff run mode to a rotation mode for starting a takeoff of the aircraft 1. In other words, the control device 12 comprises a rotation control section in the present invention.

Further, when a landing command is inputted at the takeoff and landing command inputting section 7, by controlling the propulsion device and the control surface (the elevator 8, the aileron 9 and the rudder 10) based on the information relating to the aircraft 1 (the altitude from the ground, the airspeed, the attitude angle, the direction, the position and the like), an approaching flight along a predetermined approaching path is realized. In other words, the control device 12 comprises an approaching flight control section in the present invention.

Further, when the altitude of the aircraft 1 from the ground becomes less than a predetermined landing judgment altitude, the control device 12 generates a control command for minimizing the output of the propulsion device (to an idling state), and by operating the throttle 11 according to the control command, the propulsion device is put in the idling state to be fixed. Further, when the altitude of the aircraft 1 from the ground becomes less than the predetermined landing judgment altitude, the control device 12 controls the control surface (the elevator 8) to perform a flare. By controlling the propulsion device and the control surface in this way, it is possible to shift from an approaching flight mode to a flare mode and start the flare of the aircraft 1. In other words, the control device 12 comprises a flare control section in the present invention.

Further, when the airspeed of the aircraft 1 becomes less than a predetermined landing judgment speed, the control device 12 generates a control command for maintaining the output of the propulsion device minimum (the idling state), and by operating the throttle 11 according to the control command, the propulsion device is maintained in the idling state. Further, when the airspeed of the aircraft 1 becomes the predetermined landing judgment speed, the control device 12 controls the control surface (the elevator 8, the aileron 9 and the rudder 10) to maintain the attitude angle and the traveling direction of the aircraft 1 constant. By controlling the propulsion device and the control surface in this way, it is possible to realize a landing run. In other words, the control device 12 comprises a landing run control section in the present invention.

Upon a start of the takeoff run or a completion of the landing run, when the airspeed of the aircraft 1 becomes not more than a predetermined minimum threshold, the control device 12 controls the control surface and the propulsion device by regarding an input of the airspeed as zero.

As shown in FIG. 1 and FIG. 8, the ground facility 20 comprises a DGPS ground station 21 for generating the correction information of a GPS, and a correction signal transmitter 22 for transmitting the generated correction information to the aircraft 1. The correction signal transmitter 22 transmits the correction information generated in the DGPS ground station 21 to the aircraft 1, the correction signal receiver 13 receives the correction information, and the positional information detected by the GPS receiver of the aircraft 1 is corrected based on the correction information. Thereby, it is possible to obtain a highly accurate positional information.

Next, with reference to FIG. 2 to FIG. 7, an automatic takeoff and landing method of the aircraft 1 using the automatic takeoff and landing apparatus relating to the present embodiment will be described.

[Automatic Takeoff Method]

Figure 2:
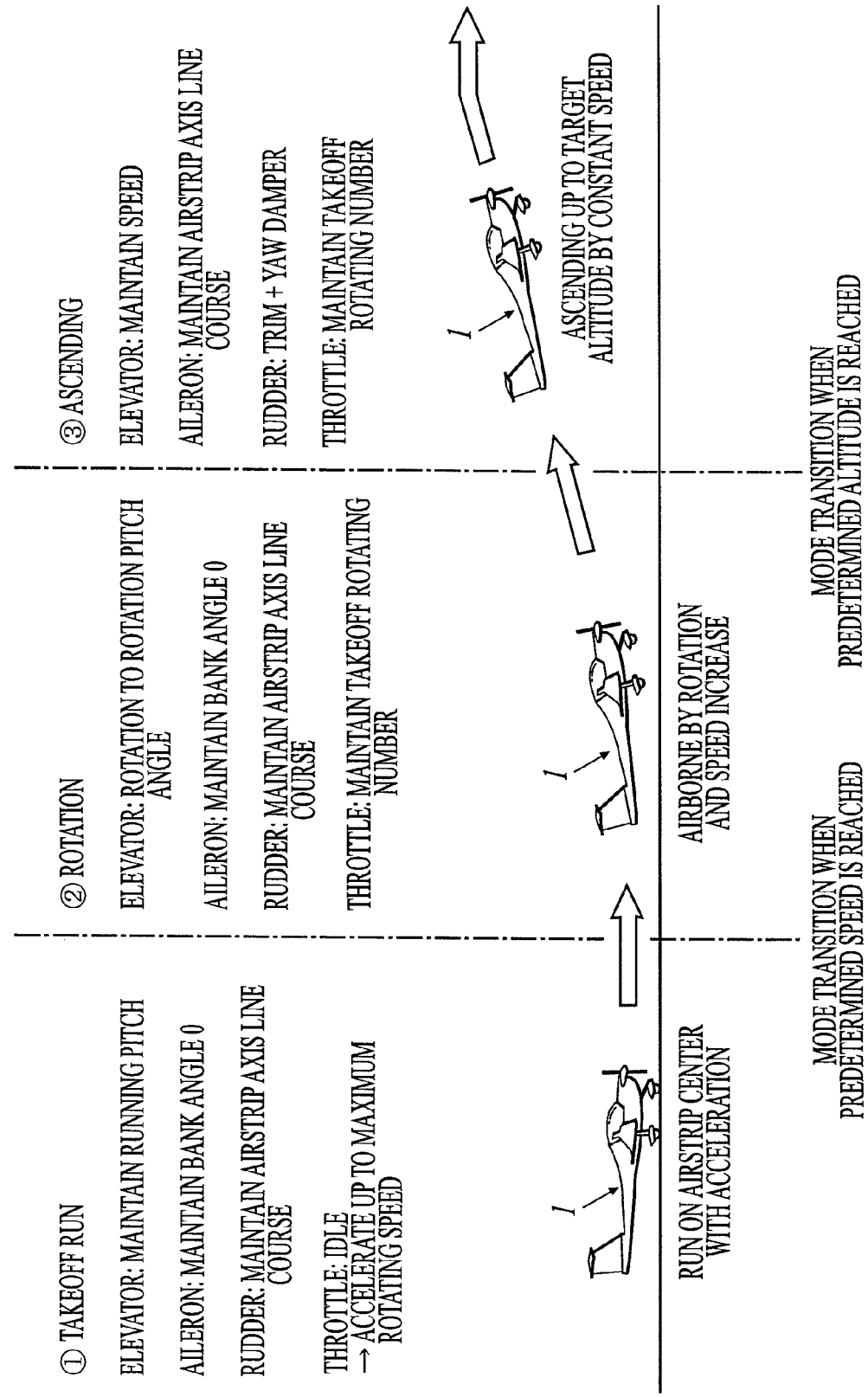
FIG. 2 is an explanatory view for explaining an automatic takeoff method of an aircraft using the automatic takeoff and landing apparatus relating to the embodiment of the present invention.
Figure 3:
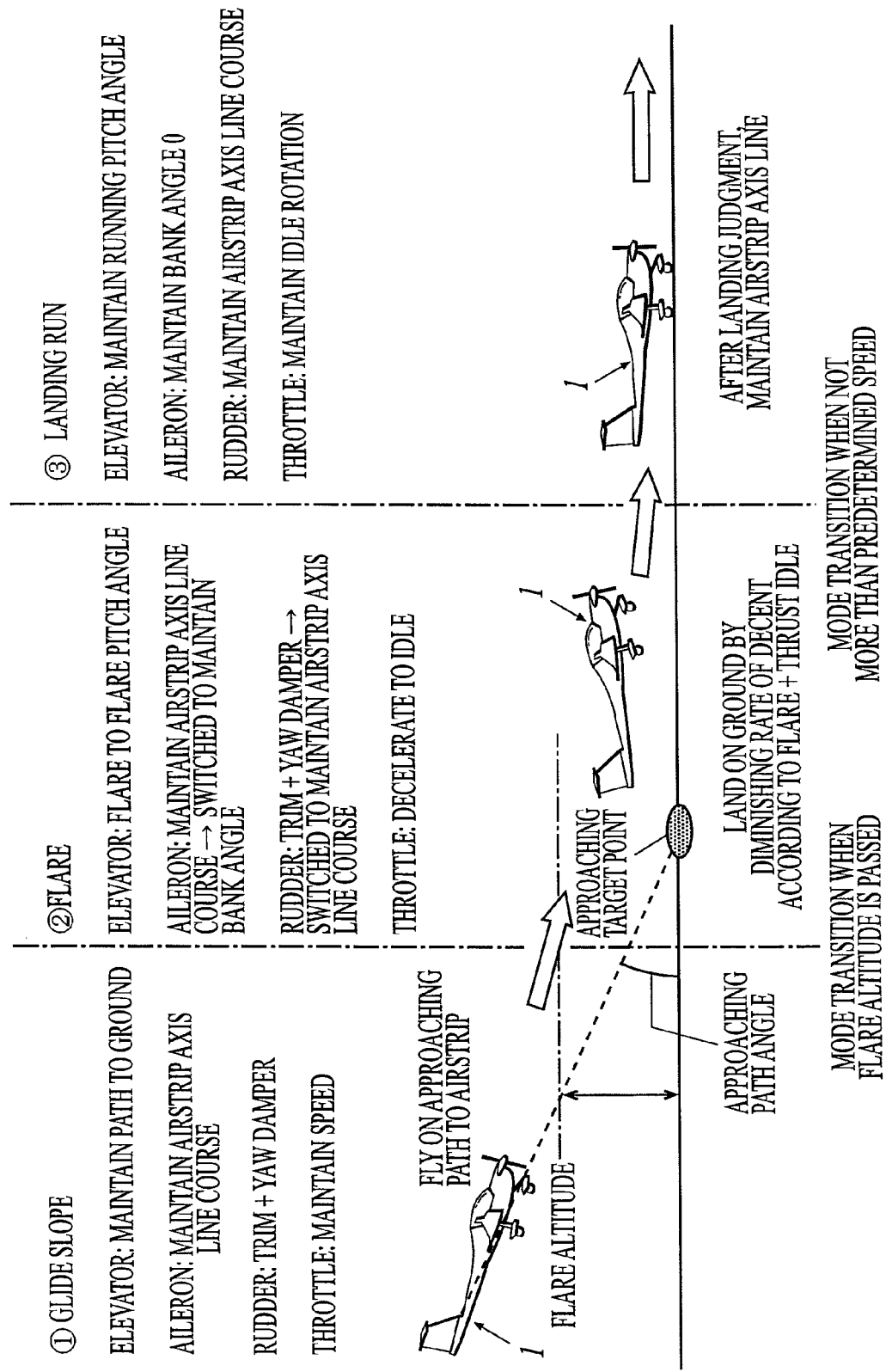
FIG. 3 is an explanatory view for explaining an automatic landing method of the aircraft using the automatic takeoff and landing apparatus relating to the embodiment of the present invention.
Figure 4:
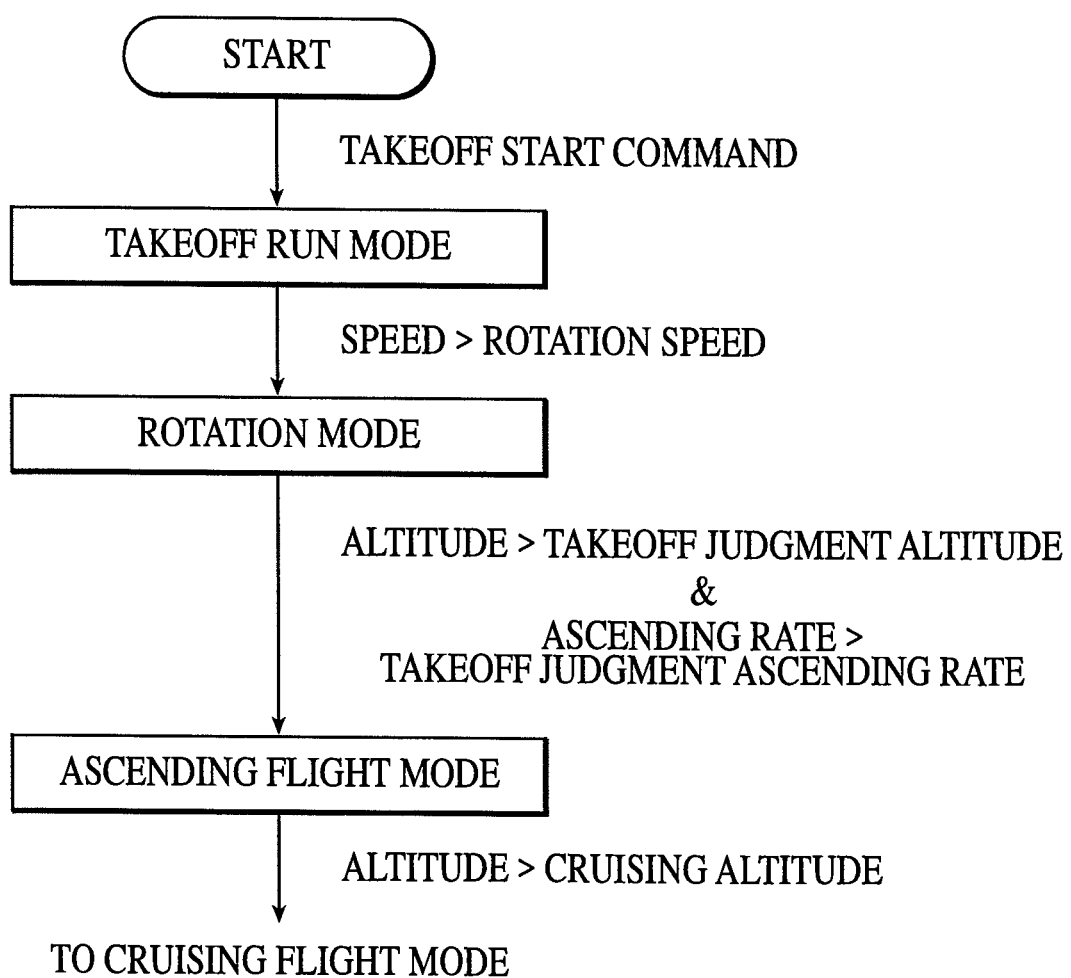
FIG. 4 is a flowchart for explaining the automatic takeoff method of the aircraft using the automatic takeoff and landing apparatus relating to the embodiment of the present invention.
Figure 5:
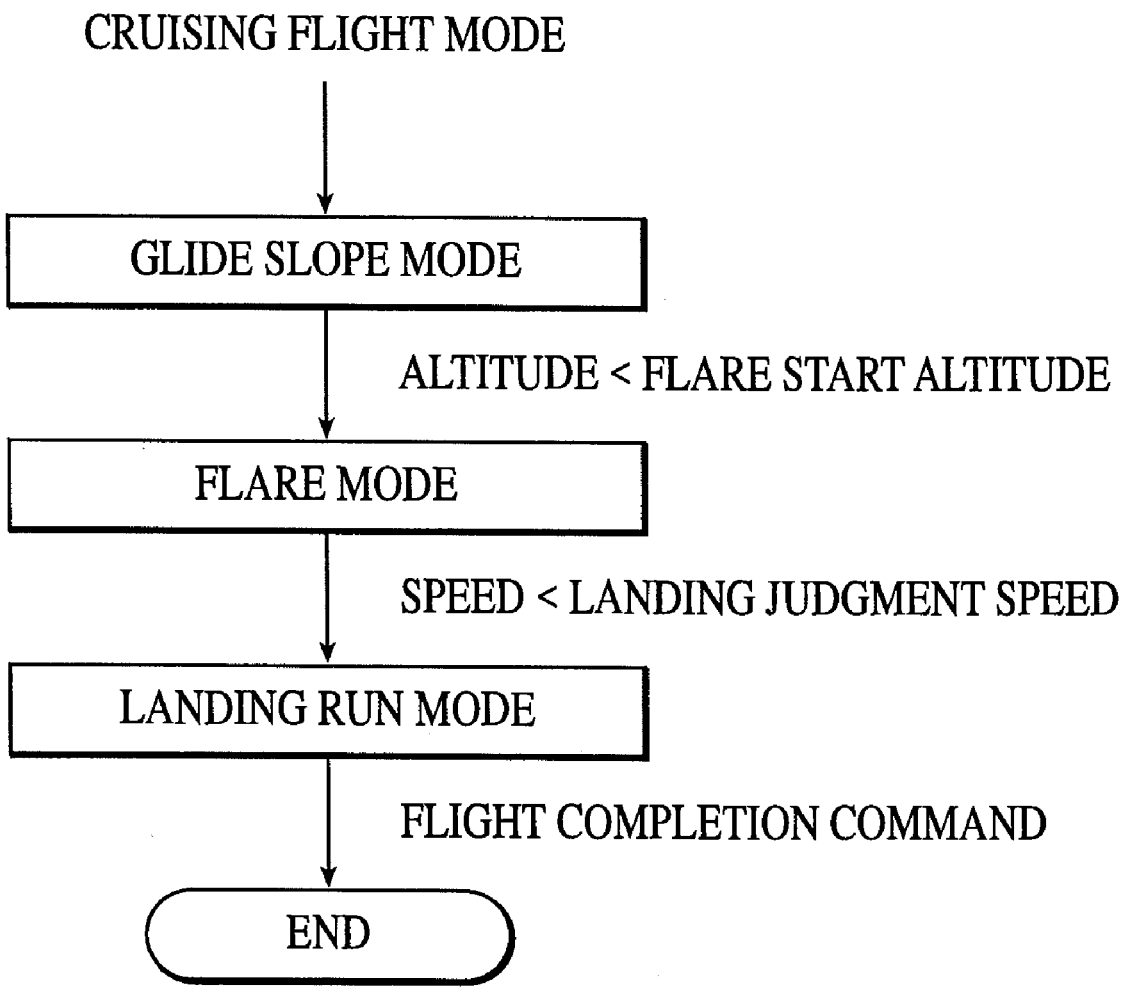
FIG. 5 is a flowchart for explaining the automatic landing method of the aircraft using the automatic takeoff and landing apparatus relating to the embodiment of the present invention.

First, with reference to FIG. 2 to FIG. 4, an automatic takeoff method of the aircraft 1 using the automatic takeoff and landing apparatus relating to the present embodiment will be described.

First, the propulsion device of the aircraft 1 is actuated, and various loaded devices such as the control device 12 and the like are actuated by turning the devices on. Then, by using the radio altimeter 2, the ADS 3, the attitude angle sensor 4, the magnetic bearing sensor 5 and the highly accurate DGPS 6, detections of the altitude from the ground, the airspeed, the attitude angle, the direction and the position of the aircraft 1 are started (aircraft information obtaining step). Then, after the aircraft is moved to a predetermined airstrip, the takeoff command is inputted from the takeoff and landing command inputting section of the aircraft 1 takeoff command inputting step). In response to the takeoff command, the control device 12 of the aircraft 1 controls the propulsion device and the control surface based on each information obtained in the aircraft information obtaining step (control step).

Hereinafter, contents of the control step will be described concretely.

(1) Takeoff Run Mode

In response to the takeoff command, the control device 12 of the aircraft 1 generates the control command for maximizing the output of the propulsion device. By operating the throttle 11 according to the control command, the output of the propulsion device is maximized and fixed to the maximum output, and the control surface is controlled to maintain the attitude angle and the traveling direction of the aircraft 1 constant (takeoff run control step).

Concretely, the control device 12 controls the elevator 8, and the aileron 9 for fixing the pitch angle to a predetermined running pitch angle and fixing a bank angle to 0 degree, and further the control device 12 controls the rudder 10 for regulating a running direction of the aircraft 1. By controlling the propulsion device and the control surface in this way, the aircraft 1 performs a straight takeoff run along an center line on the airstrip.

Next, the control device 12 of the aircraft 1 judges whether the airspeed of the aircraft 1 exceeds the predetermined takeoff judgment speed (rotation speed) or not (takeoff speed judgment step). When the control device 12 judges that the airspeed of the aircraft 1 is not more than the predetermined takeoff judgment speed in the takeoff speed judgment step, the control device 12 continues a control of the takeoff run control step.

(2) Rotation Mode

On the other hand, when the control device 12 judges that the airspeed of the aircraft 1 exceeds the predetermined takeoff judgment speed, the control device 12 controls the control surface to perform the rotation (rotation control step). Concretely, when the airspeed of the aircraft 1 exceeds the takeoff judgment speed, the control device 12 controls the elevator 8 to change the pitch angle to a predetermined rotation pitch angle. Further, the control device 12 controls the aileron 9 and the rudder 10 in the same way as the takeoff run control step, and maintains the output of the propulsion device maximum. By controlling the propulsion device and the control surface in this way, the aircraft 1 performs the rotation and starts taking off.

Next, the control device 12 of the aircraft 1 judges whether the altitude of the aircraft 1 from the ground exceeds the predetermined takeoff judgment altitude or not, and judges whether an altitude change rate (ascending rate) of the aircraft 1 exceeds a predetermined takeoff judgment ascending rate or not (takeoff altitude judgment step). In the takeoff altitude judgment step, when the control device 12 judges that the altitude of the aircraft 1 from the ground is not more than the predetermined takeoff judgment altitude or when the control device 12 judges that the ascending rate of the aircraft 1 is not more than the predetermined takeoff judgment ascending rate, the control device 12 continues a control of the rotation control step.

(3) Ascending Flight Mode

On the other hand, in the takeoff altitude judgment step, when the control device 12 judges that the altitude of the aircraft 1 from the ground exceeds the predetermined takeoff judgment altitude and also judges that the ascending rate of the aircraft 1 exceeds the predetermined takeoff judgment ascending rate, the control device 12 controls the propulsion device and the control surface to make the aircraft 1 perform an ascending flight up to a predetermined target altitude with a predetermined ascending rate maintained (ascending flight control step).

Concretely, the control device 12 controls the elevator 8 for maintaining the predetermined ascending rate and controls the aileron 9 for making the aircraft 1 perform a straight flight along the center line on the airstrip, and further the control device 12 controls the rudder 10 for correcting aircraft heading, and maintains the output of the propulsion device maximum. By controlling the propulsion device and the control surface in this way, it is possible to complete a takeoff of the aircraft 1 and start a cruising flight at the target altitude.

[Automatic Landing Method]

Next, with reference to FIG. 3 and FIG. 5 to FIG. 7, an automatic landing method of the aircraft 1 using the automatic takeoff and landing apparatus relating to the present embodiment will be described.

First, during the predetermined cruising flight, the control device 12 of the aircraft 1 detects the altitude from the ground, the airspeed, the attitude angle, the flight direction and the position of the aircraft 1, by using the radio altimeter 2, the ADS 3, the attitude angle sensor 4, the magnetic bearing sensor 5 and the highly accurate DGPS 6 (aircraft information obtaining step). Then, the landing command is inputted from the takeoff and landing command inputting section 7 (landing command inputting step). In response to the landing command, the control device 12 of the aircraft 1 controls the propulsion device and the control surface based on each information obtained in the aircraft information obtaining step (control step).

Hereinafter, contents of the control step will be described.

(1) Glide Slope Mode

In response to the landing command, the control device 12 of the aircraft 1 realizes the approaching flight along the predetermined approaching path by controlling the propulsion device and the control surface (approaching flight control step). Concretely, the control device 12 controls the aileron 9 to make the aircraft 1 perform the straight flight along the center line on the airstrip, controls the rudder 10 to correct the aircraft heading, and controls the elevator 8 to realize the approaching flight along the approaching path shown in FIG. 3 (path taking a predetermined approaching path angle from an approaching target point). At this time, the control device 12 maintains the output of the propulsion device equal to the output in the cruising flight.

Next, the control device 12 of the aircraft 1 judges whether the altitude of the aircraft 1 from the ground becomes less than the landing judgment altitude (flare start altitude) or not (landing altitude judgment step). In the landing altitude judgment step, when the control device 12 judges that the altitude of the aircraft 1 from the ground is not less than the predetermined landing judgment altitude, the control device 12 continues a control of the approaching flight control step.

(2) Flare Mode

On the other hand, in the landing altitude judgment step, when the control device 12 judges that the altitude of the aircraft 1 from the ground is less than the predetermined landing judgment altitude, the control device 12 controls the propulsion device to provide the minimum output and controls the control surface to perform the flare (flare control step).

Figure 6A:
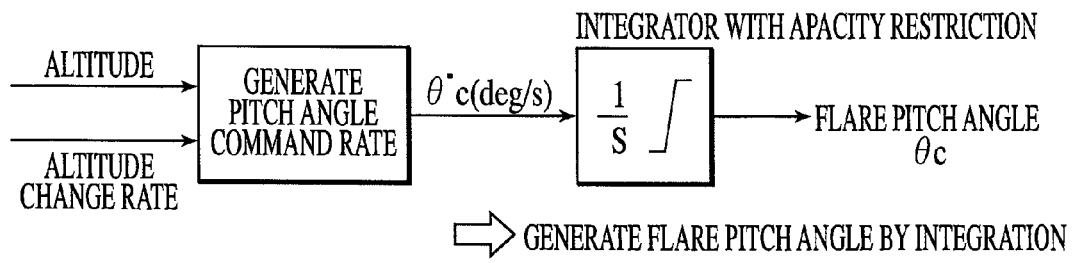
FIGS. 6A to 6C are explanatory views for explaining a procedure for determining a flare pitch angle used under a flare mode of the automatic landing method of the aircraft using the automatic takeoff and landing apparatus relating to the embodiment of the present invention.

Concretely, the control device 12 generates the control command for minimizing the output of the propulsion device (idling state), and by operating the throttle according to the control command, the propulsion device is put in the idling state to be fixed, and the control device 12 controls the elevator 8 to change the pitch angle to a predetermined flare pitch angle. By controlling the propulsion device and the control surface in this way, the aircraft 1 starts the flare. Here, in the flare control step, the control device 12 controls the aileron 9 to fix the bank angle to 0 degree, and controls the rudder 10 to regulate a flying direction of the aircraft 1. Further, in the flare step, as shown in FIG. 6A, a pitch angle command rate is generated based on the altitude of the aircraft 1 from the ground and an altitude change rate of the aircraft 1, and the flare pitch angle is calculated by integrating the pitch angle command rate.

Figure 6B:
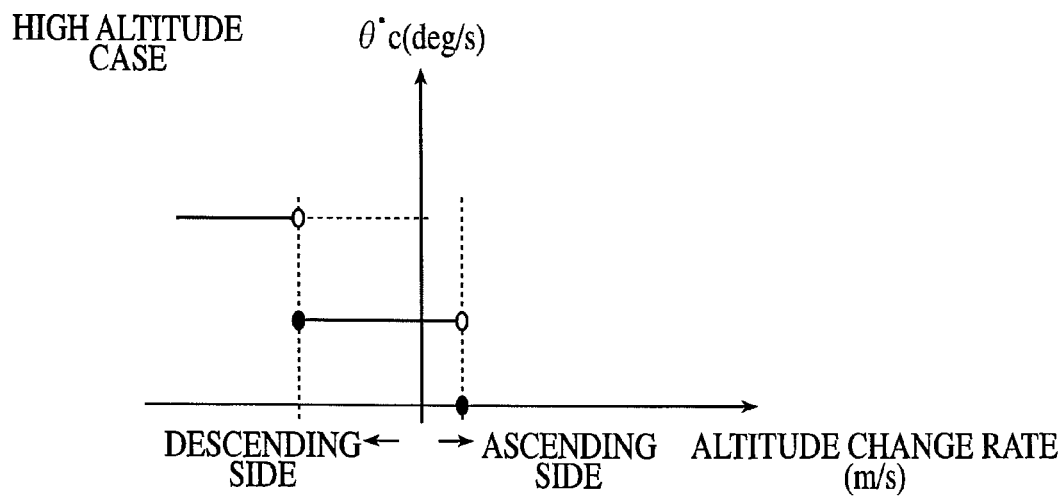

For example, when the altitude of the aircraft 1 from the ground is a comparatively high altitude, it is possible to generate the pitch angle command rate according to a graph shown in FIG. 6B. When the altitude change rate is negative, the pitch angle command rate is set to a comparatively large value to enhance a flare effect, and when the altitude change rate is within a range where the value is changed from negative to positive, the pitch angle command rate is set to an approximately medium value. Further, when the altitude change rate is positive, the pitch angle command rate is set to zero for suppressing a flare.

Figure 6C:
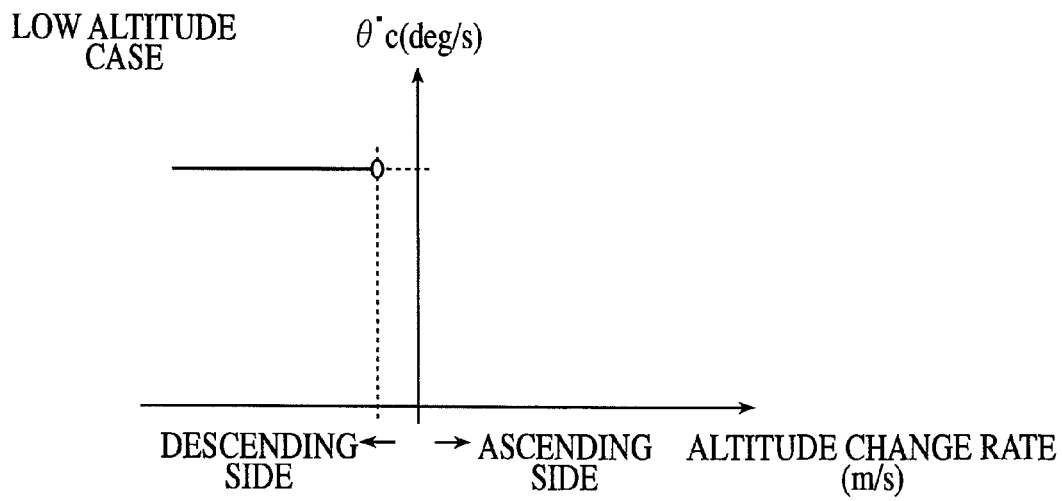

Further, when the altitude of the aircraft 1 from the ground is a low altitude, it is possible to generate the pitch angle command rate based on a graph shown in FIG. 6C. When the altitude from the ground is comparatively low and the altitude change rate is negative, a large value is set to the pitch angle command rate for making the aircraft I perform the flare immediately. Further, when the altitude change rate is positive (or negative but approximate to positive), the pitch angle command rate is set to zero for suppressing the flare.

Figure 7:
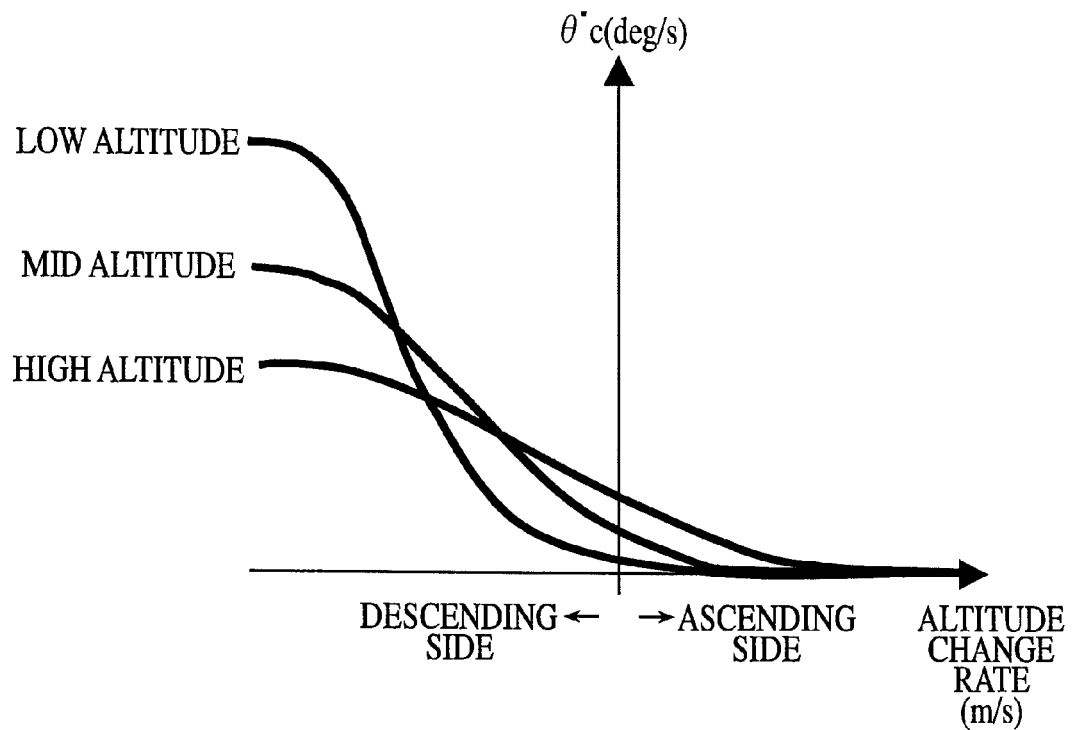
FIG. 7 is another explanatory view for explaining the procedure for determining a flare pitch angle used under the flare mode of the automatic landing method of the aircraft using the automatic takeoff and landing apparatus relating to the embodiment of the present invention.

Further, it is also possible to generate the pitch angle command rate according to a graph shown in FIG. 7. When the altitude of the aircraft 1 from the ground is a low altitude and the altitude change rate is negative, a large value is set to the pitch angle command rate for making the aircraft 1 perform the flare immediately. On the other hand, when the altitude of the aircraft 1 from the ground is a high altitude and the altitude change rate is negative, a comparatively low value is set to the pitch angle command rate for making the aircraft 1 perform the flare moderately. Then, while the altitude change rate is changed from negative to positive, the pitch angle command rate is decreased, and when the altitude change rate becomes positive, the pitch angle command rate is set to zero for suppressing the flare.

While such a flare control step is being implemented, the control device 12 of the aircraft 1 judges whether the airspeed of the aircraft 1 becomes less than the predetermined landing judgment speed or not (landing speed judgment step). In the landing speed judgment step, when the control device 12 judges that the airspeed of the aircraft 1 is not less than the predetermined landing judgment speed, the control device 12 continues a control of the flare control step.

(3) Landing Run Mode

On the other hand, in the landing speed judgment step, when the control device 12 judges that the airspeed of the aircraft 1 is less than the predetermined landing judgment speed, the control device 12 controls the propulsion device to maintain the minimum output, and controls the control surface to maintain the attitude angle of the aircraft 1 constant (landing run control step).

Concretely, the control device 12 generates the control command for maintaining the output of the propulsion device minimum (idling state), and by operating the throttle according to the control command, the propulsion device is maintained in the idling state. Further, the control device 12 controls the elevator 8 and the aileron 9 to fix the pitch angle to a predetermined running pitch angle and to fix the bank angle to zero, and further the control device 12 controls the rudder 10 to regulate the flying direction and the running direction of the aircraft 1. By controlling the propulsion device and the control surface in this way, after the aircraft 1 lands on the airstrip, the aircraft 1 performs the straight landing run along the center line on the airstrip.

As described above, in the automatic takeoff and landing apparatus relating to the present embodiment, in response to the takeoff command, the control device 12 of the aircraft 1 controls the propulsion device of the aircraft 1 to provide the maximum output, and controls the control surface to maintain the attitude angle and the traveling direction of the aircraft 1 constant, for realizing the takeoff run. Next, when the airspeed of the aircraft 1 exceeds the predetermined takeoff judgment speed (rotation speed), the control device 12 controls the control surface to perform the rotation. Continuously, when the altitude of the aircraft 1 from the ground exceeds the predetermined takeoff judgment altitude and the ascending rate of the aircraft 1 exceeds the predetermined takeoff judgment ascending rate, the control device 12 controls the propulsion device and the control surface to make the aircraft 1 perform the ascending flight up to the predetermined target altitude with the predetermined ascending speed maintained.

In other words, whether shifting from the takeoff run mode to the rotation mode should be done is judged by referring to "airspeed" of the aircraft 1, and whether shifting from the rotation mode to the ascending flight mode should be done is judged by referring to "altitude from ground" of the aircraft 1. Thereby, it is possible to realize a full automatic takeoff from a ground run to an ascending flight. Furthermore, at this time, since a judgment of a takeoff (whether a takeoff is completed and it is possible to shift to the ascending flight) is done by referring to "altitude from ground" of the aircraft 1, it is not necessary to use a landing gear switch for the judgment of the takeoff. Therefore, it is possible to realize the full automatic takeoff without using a complicated loaded device or a complicated control logic.

Further, in the automatic takeoff and landing apparatus relating to the present embodiment as described above, in response to the landing command, the control device 12 of the aircraft 1 controls the propulsion device and the control surface to realize the approaching flight along the predetermined approaching path. Next, when the altitude of the aircraft 1 from the ground is less than the predetermined landing judgment altitude (flare start altitude), the control device 12 controls the propulsion device to provide the minimum output and controls the control surface to perform the flare. Continuously, when the airspeed of the aircraft 1 becomes less than the predetermined landing judgment speed, the control device 12 controls the propulsion device to maintain the minimum output and controls the control surface to maintain the attitude angle and the traveling direction of the aircraft 1 constant, for realizing the landing run.

In other words, whether shifting from the approaching flight mode to the flare mode should be done is judged by referring to "altitude from the ground" of the aircraft 1, and whether shifting from the flare mode to the landing run mode should be done is judged by referring to "airspeed" of the aircraft 1. Thereby, it is possible to realize a full automatic landing from the approaching flight to the run after the landing.

Figure 9:
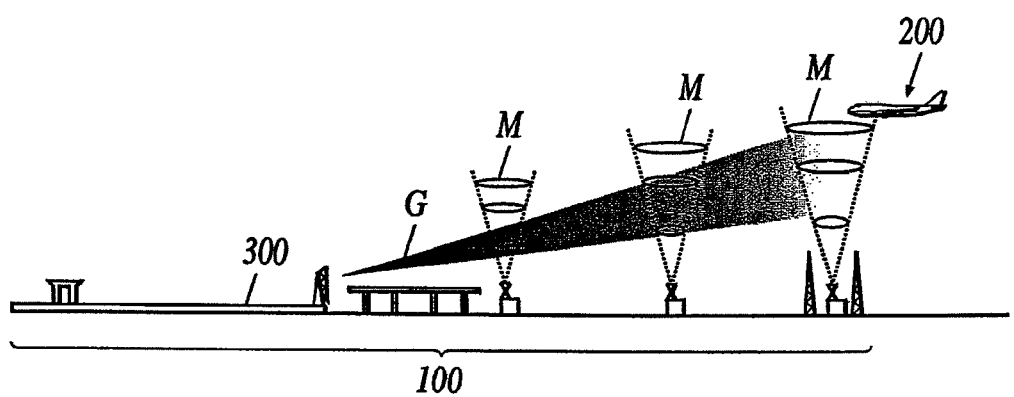
FIG. 9 is an explanatory view for explaining a conventional automatic landing apparatus (ILS: Instrument Landing System).

Further, in the automatic takeoff and landing apparatus relating to the present embodiment as described above, the highly accurate DGPS 6 is used as the position sensor. Therefore, it is possible to detect a position of the aircraft 1 highly accurately and it is possible to control the attitude and the speed of the aircraft based on the highly accurate positional information. Thereby, it is not necessary to have a conventional radio navigation facility as shown in FIG. 9. Here, values of the takeoff judgment speed (rotation speed), the takeoff judgment altitude, the takeoff judgment change rate the landing judgment altitude (flare start altitude) and the landing judgment airspeed used in the above-described embodiment may be suitably changed according to a size of the airframe of the aircraft 1 and flight properties of the aircraft 1.

Further, in the above-described embodiment, as shown in FIG. EA to FIG. 7, described is the case that the pitch angle command rate is generated based on the altitude of the aircraft 1 from the ground and the altitude change rate, and the flare pitch angle is calculated by integrating the pitch angle command rate. However, the procedure for calculating (determining) the flare pitch angle is not limited to this case.

Further, the present invention can be applied to not only the automatic takeoff and landing apparatus of a manned fixed wing aircraft, but to an automatic takeoff and landing apparatus of an unmanned fixed wing aircraft.

What is claimed is:

1. An automatic landing apparatus for an aircraft comprising:
- an altitude sensor for measuring an altitude of the aircraft from ground;
- an airspeed sensor for measuring an airspeed of the aircraft;
- an attitude angle sensor for detecting an attitude angle of the aircraft;
- a direction sensor for detecting a direction of the aircraft;
- a position sensor for detecting a position of the aircraft;
- a landing command inputting section for inputting a landing command; and
- a control device for controlling a propulsion device and a control surface of the aircraft, based on the altitude of the aircraft from the ground, the airspeed of the aircraft, the attitude angle of the aircraft, the direction of the aircraft, the position of the aircraft and the landing command,
- wherein the control device comprises:
  - an approaching flight control section for realizing an approaching flight along a predetermined approaching path by triggering the control device to control the propulsion device and the control surface, in response to the landing command;
  - a flare control section which judges whether or not the altitude of the aircraft from the ground is at or less than a predetermined landing judgment altitude, which predetermined landing judgment altitude is a stored parameter of the control device, and when the altitude of the aircraft from the ground is judged to be at or less than the predetermined, stored landing judgment altitude, said control device is triggered into changing the propulsion device as to provide a minimum output and into changing the control surface as to perform a flare by setting a pitch angle of the aircraft to a predetermined pitch angle, wherein the predetermined pitch angle is calculated by integrating a pitch angle command rate based on the altitude and altitude change rate of the aircraft; and
  - a landing run control section which judges whether or not the airspeed of the aircraft is at or less than a predetermined landing judgment speed, which predetermined landing judgment speed is a stored parameter of the control device, and, when the airspeed of the aircraft is judged to satisfy the criteria of being at or less than the predetermined, stored landing judgment speed, the control device is triggered into a landing run mode wherein the propulsion device is controlled to maintain the minimum output and the control surface is controlled to maintain constant the attitude angle and a traveling direction of the aircraft to realize a landing run.

2. An automatic landing apparatus for an aircraft according to claim 1,
   wherein said altitude sensor is one of a radio altimeter or a laser altimeter.

3. An automatic landing apparatus for an aircraft according to claim 1,
   wherein said airspeed sensor is an air data sensor.

4. An automatic landing apparatus for an aircraft according to claim 1,
   wherein said attitude angle sensor is a gyro.

5. An automatic landing apparatus for an aircraft according to claim 1,
   wherein said direction sensor is a magnetic bearing sensor.

6. An automatic landing apparatus for an aircraft according to claim 1,
   wherein said position sensor is a Differential Global Positioning System.

7. An automatic landing apparatus for an aircraft according to claim 1,
   wherein said landing command inputting section is a switch operated by a person on the aircraft.

8. An automatic landing apparatus for an aircraft according to claim 1,
   wherein said landing command inputting section is a receiver for receiving said landing command from an outside of said aircraft.

9. An automatic landing apparatus for an aircraft according to claim 1, wherein said control surface comprises at least one of an elevator, an aileron and a rudder.

10. An automatic landing apparatus for an aircraft according to claim 1, wherein said control device controls said control surface to fix a bank angle of the aircraft to zero when the airspeed of the aircraft is at or less than said predetermined landing judgment speed.

11. An automatic landing apparatus for an aircraft according to claim 1, wherein
    the pitch angle command rate is set to a large value when the altitude change rate is lower than a first predetermined value,
    the pitch angle command rate is set to a small value when the altitude change rate is between the first predetermined value and a second predetermined value, and
    the pitch angle command rate is set to zero when the altitude change rate is higher than the second predetermined value.

12. An automatic landing apparatus for an aircraft according to claim 1, wherein the pitch angle command rate is set to a large value when the altitude change rate is lower than a predetermined value, and the pitch angle command rate is set to zero when the altitude change rate is higher than the predetermined value.

13. An automatic landing apparatus for an aircraft according to claim 1, wherein the pitch angle command rate decreases with a decrease in altitude change rate of the aircraft.

14. An automatic landing apparatus for an aircraft according to claim 1, wherein an absolute value of a maximum rate of the pitch angle command rate decreases with an increase in altitude of the aircraft.

15. The automatic landing apparatus for an aircraft according to claim 1 wherein said control device includes a processor and a memory with the memory being loaded with flight control data inclusive of a predetermined landing judgment altitude and a predetermined landing judgment speed.

16. The automatic landing apparatus for an aircraft according to claim 1, wherein said control device includes a pitch angle command rate generator with integrator, and said pitch angle command rate generator, based on inputs as to altitude and altitude change rate, integrates with the integrator an integrated flare pitch angle output.

17. An automatic landing apparatus for an aircraft according to claim 1, wherein, when the altitude of the aircraft is determined to be equal to or above a predetermined high altitude value, the pitch angle command rate is set to a first maximum rate; and
    when the altitude of the aircraft is determined to be equal to or below a predetermined low altitude value, the pitch angle command rate is set to a second maximum rate; wherein
    the second maximum rate is higher than the first maximum rate.

18. An automatic landing apparatus for an aircraft according to claim 1, wherein, the landing run control section judges whether or not the airspeed of the aircraft is at or less than the predetermined landing judgment speed during an implementation of a change in pitch angle toward the predetermined pitch angle.

19. An automatic landing apparatus for an aircraft according to claim 1, wherein, when the altitude of the aircraft is determined to be equal to or above a predetermined high altitude value, the pitch angle command rate is set to a first maximum rate to perform a flare; and when the altitude of the aircraft is determined to be equal to or below a predetermined low altitude value, the pitch angle command rate is set to a second maximum rate to perform a flare; wherein the flare performed by setting the pitch angle command rate to the second maximum rate is more immediate than the flare performed by setting the pitch angle command rate to the first maximum rate.

20. An automatic takeoff and landing apparatus for an aircraft comprising:

the automatic landing apparatus of claim 1;

a takeoff command inputting section for inputting a takeoff command;

wherein the control device controls the propulsion device and the control surface of the aircraft, based on the altitude of the aircraft from the ground, the airspeed of the aircraft, the attitude angle of the aircraft, the direction of the aircraft, the position of the aircraft, the takeoff command and the landing command, and wherein the control device further comprises:

a takeoff run control section for realizing a takeoff run by triggering the control device to control the propulsion device to provide a maximum output and control the control surface to maintain them attitude angle and a traveling direction of the aircraft constant, in response to the takeoff command;

a rotation control section for triggering the control device to control the control surface to perform a rotation when the airspeed of the aircraft reaches or exceeds a predetermined takeoff judgment speed;

an ascending flight control section for triggering the control device to control the propulsion device and the control surface to make the aircraft perform an ascending flight up to a predetermined target altitude with a predetermined ascending speed maintained, when the altitude of the aircraft from the ground reaches or exceeds a predetermined takeoff judgment altitude.

21. An unmanned fixed wing aircraft comprising the automatic landing apparatus of claim 1 and a receiver for receiving from a remote location a landing command.

* * * * *